Dec. 26, 1961     P. J. GYSBERS     3,014,442
TUBE RETAINER
Filed Feb. 19, 1960
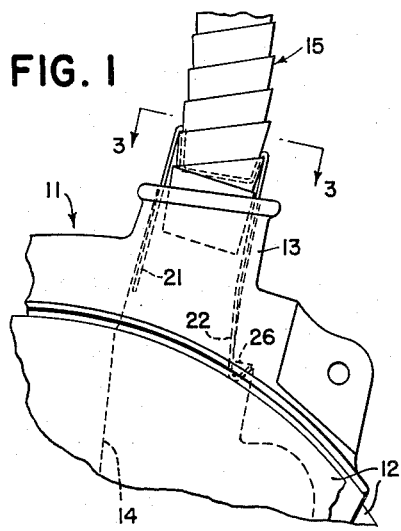
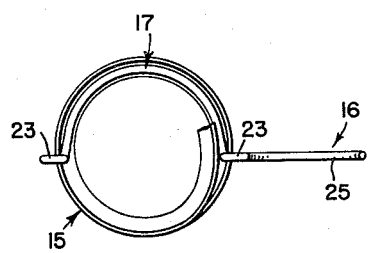
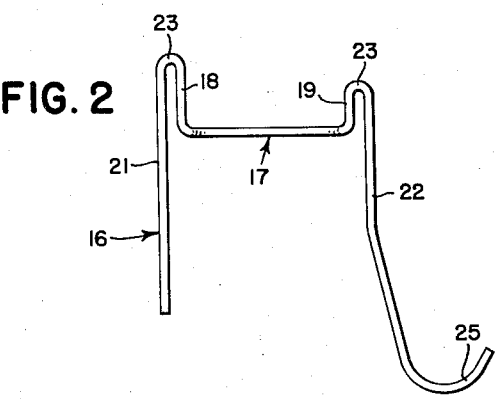
*INVENTOR.*
PAUL J. GYSBERS
BY
ATTORNEYS United States Patent Office 3,014,442
Patented Dec. 26, 1961

3,014,442
TUBE RETAINER
Paul J. Gysbers, Horicon, Wis., assignor to Deere & Company, Moline, Ill., a corporation of Delaware
Filed Feb. 19, 1960, Ser. No. 9,806
1 Claim. (Cl. 111—87)

This invention relates generally to agricultural implements and more particularly to grain drills and the like.

The object and general nature of this invention is the provision of new and improved means for connecting a grain tube of the helical ribbon type to the boot casting of a furrow opener. As will be readily understood by those skilled in the art of agricultural implements, grain drills and other similar planting implements are provided with frame-carried hoppers and lower generally vertically movable furrow openers mounted on boot castings that can be raised and lowered relative to the main frame of the implement, with flexible tubes extending downwardly from the hopper to the boot castings for conveying seed, fertilizer or other material to the furrows opened by the furrow openers. The helical steel riveted tube is in relatively wide use for conducting seed and fertilizer from the hopper to the associated furrow openers and a tube of this type has the advantage of adequate flexibility to accommodate raising and lowering of the furrow opener boots.

The object and general nature of this invention is the provision of a new and improved tube-retainer especially adapted for use with a ribbon tube for connecting the lower end thereof to the associated boot so as to provide a secure connection while at the same time accommodating flexing of the tube in operation.

Specifically, a feature of this invention is the provision of a tube-retaining clip that has a central curved portion adapted to be inserted between adjacent turns or coils of the tube and L-portions that are readily insertable into the tube-receiving opening of the furrow opener boot for securely holding the parts in position, yet which may be readily detached therefrom when necessary.

These and other objects and advantages of this invention will be apparent to those skilled in the art after consideration of the following description, taken in conjunction with the accompanying drawings, in which:

FIG. 1 is a fragmentary side view of the furrow opener of a grain drill and a portion of the associated grain tube, with retaining means therefor constructed according to the principles of this invention.

FIG. 2 is a side view of the tube-retaining clip, FIG. 2 being drawn at an enlarged scale as compared with FIG. 1.

FIG. 3 is a sectional view taken generally along the line 3—3 of FIG. 1 at an enlarged scale and with the boot casting omitted.

Referring first to FIG. 1, the furrow opener of the grain drill is represented by a boot casting 11 forming a support for a pair of furrow opening disks 12 journaled by any suitable means on the lower portion of the boot casting 11. The latter is provided with an upper tube-receiving section 13 that is generally circular in cross section, as is conventional, the inner portion of which communicates with a passage 14 through which seed or other material may be delivered to the furrow opened by the disks 12. The grain drill carries suitable hopper means and material dispensing or selecting means (not shown) and seed or other material is delivered downwardly to the boot casting 11 through a steel ribbon tube 15. The tube 15 is quite flexible, since in the conventional grain drill the furrow openers and the associated furrow opener boots are raised and lowered between operating and transporting positions, and also the boots may move up and down during passage of the implement over uneven ground.

According to this invention, new and improved means is provided for fastening the lower end of the ribbon tube 15 to the boot casting 11. The preferred form of the tube-retaining means is shown in detail in FIGS. 2 and 3. The tube retainer, indicated in its entirety by the reference numeral 16, comprises a wire-like member that includes a center section 17 generally arcuate in a horizontal plane, and therefore generally semi-circular in plan (FIG. 3). The arcuate center section has upturned ends 18 and 19 to which depending end portions 21 and 22 are connected. The two sections joining the ends 18, 21 and 19, 22 are in the form of loops 23 extending generally upwardly and lying substantially in the vertical plane that passes generally centrally through the seed tube 15. One of the end portions, as indicated at 22, is extended downwardly and laterally outwardly and shaped as a hook section 25 so as to engage under a shoulder 26 formed on the inside of the boot casting and accessible from the upper end of the passage 14.

In order to fasten the tube 15 in place, the clip 16 is first interconnected with the tube by passing the arcuate section 17 downwardly in between adjacent turns or coils of the tube, and then the two end portions 21 and 22, which lie outside the tube 15, are passed downwardly into the upper portion of the passage 14 until the hook section 25 is in the position to snap under the shoulder 26. The clip 16 has sufficient resiliency and is so formed that when inserted in the boot casting, the end portion 21 acts against the adjacent side of the upper portion 13 of the boot casting so as to yieldably retain the hook section 25 underneath the shoulder 26. Thus, the end portion 21 acts as the guide or stabilizer to hold the parts in tube-retaining position in the boot casting.

To disconnect the tube 15 from the boot casting 11, all that is necessary to do is to spring the end section 22 inwardly to an extent sufficient to disengage the hook 25 from the shoulder 26, after which the retaining clip 16 and the end of the tube 15 may readily be withdrawn from the upper end of the passage 14.

It will readily be seen from FIG. 1 that since the arcuate central section 17 of the retaining clip may be inserted into the space between adjacent coils at different distances from the lower end of the tube, one length of tube may suffice for several different implements, inasmuch as the arcuate section 17 may be engaged at higher or lower points on the tube 15 and the lower end of the latter may be inserted to greater or lesser extent, as necessary, into the passage 14.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

In a grain drill or the like having furrow opening means, a furrow opener boot carrying said furrow opening means and including a tube-receiving opening, and a tube of the helical ribbon type having overlapping turns and a lower end portion extending into said tube-receiving opening, the combination therewith of a tube retainer comprising a clip formed of wire-like material having two generally depending spaced apart end portions, an arcuate center section lying normally below the upper ends of said end portions and having upturned ends joined at their upper portions by ribbon-embracing upwardly extending loops to said upper ends of said spaced apart end portions, said arcuate center section extending downwardly into said tube from one side thereof between adjacent overlapping turns thereof, and means on the lower end of at least one of said depending end portions releasably engaging an adjacent part of said furrow opener boot for locking the clip and said tube in place in said boot.

References Cited in the file of this patent

UNITED STATES PATENTS

| | | |
|---|---|---|
| 814,957 | Ham | Mar. 13, 1906 |
| 1,013,338 | Van Brunt | Jan. 2, 1912 |
| 2,818,036 | Phillips | Dec. 31, 1957 |
| 2,861,527 | Phillips | Nov. 25, 1958 |